United States Patent [19]
Bagley et al.

[11] Patent Number: 5,259,190
[45] Date of Patent: Nov. 9, 1993

[54] HEATED CELLULAR STRUCTURES

[75] Inventors: Rodney D. Bagley, Big Flats; G. Daniel Lipp, Painted Post, both of N.Y.

[73] Assignee: Corning Incorporated, Corning, N.Y.

[21] Appl. No.: 848,094

[22] Filed: Mar. 9, 1992

Related U.S. Application Data

[63] Continuation-in-part of Ser. No. 739,306, Nov. 8, 1991, abandoned.

[51] Int. Cl.⁵ ............................ F01N 3/02; F01N 3/28
[52] U.S. Cl. .......................................... 60/300; 55/466; 55/523; 55/DIG. 30; 60/303; 422/174
[58] Field of Search ............. 60/300, 303; 422/174; 55/466, DIG. 30, 523

[56] References Cited

U.S. PATENT DOCUMENTS

| | | | |
|---|---|---|---|
| 4,283,207 | 8/1982 | Martyniuk | 60/311 |
| 4,427,418 | 1/1984 | Kogiso | 60/300 |
| 4,505,107 | 3/1985 | Yamaguchi | 60/303 |
| 4,505,726 | 3/1985 | Takeuchi | 60/311 |
| 4,535,589 | 8/1985 | Yoshida | 60/303 |
| 4,662,911 | 5/1987 | Hirayama | 55/282 |
| 4,813,231 | 3/1989 | Bykowski | 60/274 |

FOREIGN PATENT DOCUMENTS

| | | |
|---|---|---|
| 0244061 | 11/1987 | European Pat. Off. |
| 0454346 | 10/1991 | European Pat. Off. |
| 3608801 | 9/1987 | Fed. Rep. of Germany |
| 54-160589 | 12/1979 | Japan |
| 57-110311 | 7/1982 | Japan |
| 58-143815 | 8/1983 | Japan |
| 58-143817 | 8/1983 | Japan |

*Primary Examiner*—Douglas Hart
*Attorney, Agent, or Firm*—Angela N. Nwaneri

[57] ABSTRACT

An electrically conductive cellular or honeycomb structure wherein the structure is heated to light off exhaust gases and/or to burn off deposited carbon particulates and thus periodically regenerate the structure. Electrodes attached to the surface of the structure or body pass electrical currents through the body, the currents causing temperature increase by resistance heating. The electrodes are radially or angularly spaced around the outer surface of the structure, near its input end face to thereby achieve a uniform temperature distribution at the input end face for quick light-off and/or for more complete combustion of the carbon particulates. This temperature distribution can also be made more uniform by the distribution of plugs of varying thickness and/or resistivity in selected areas of the input end face of the structure. The structure can be of the porous wall type wherein alternate passageways are plugged at the front and rear faces. The structure may be also formed of an aluminum iron alloy.

18 Claims, 2 Drawing Sheets

HEATED CELLULAR STRUCTURES

This is a continuation-in-part of U.S. Ser. No. 739,306, filed Aug. 1, 1991, abandoned upon the filing hereof.

BACKGROUND OF THE INVENTION

This invention relates to the art of removing pollutants from the exhaust of combustion systems, in particular, internal combustion engines. Specifically, the invention discloses a device and method for heating a cellular or honeycomb structure used for emission control in order to initiate faster catalytic light-off and/or to heat a diesel particulate filter. More particularly, the invention relates to a filter for removing particulates such as carbon, from the exhaust of diesel engines. The invention also relates to a device, and method for reducing the catalytic light-off time of a cellular or honeycomb structure when such structure is used as a catalytic converter for internal combustion engines.

When a catalytic substrate or structure is heated to a sufficiently high temperature, a reaction occurs which converts the dangerous pollutants to harmless gases. Typically, there is a time span between the time the emission begins, that is, cold start, to the time the substrate heats up sufficiently for catalyst "light-off" to occur. Light-off time is defined as the time it takes to achieve a 50 percent conversion efficiency. The temperature at which light-off occurs is generally in the range of about 250 to 350 degrees centigrade. The unreacted pollutants generated prior to light-off contribute significantly to the total pollutants generated during the start-up cycle of an engine. Modifications are being made to catalytic converters to increase the rate of heating in order to obtain shorter light-off times. By reducing the light-off time, the amount of pollutants escaping into the atmosphere can be reduced.

Diesel particulate filters have been found effective for trapping carbon particles in diesel engine exhaust fumes. For example, U.S. Pat. No. 4,329,162 issued to Pitcher, Jr., herein incorporated by reference, discloses a diesel particulate filter wherein the walls of the individual passageways through the filter are porous, with both the inlet and the outlet of the filter having alternate openings and plugs, as in the manner of the design of a checkerboard. As shown for example at FIG. 2 of the Pitcher patent, the flow is such that approximately one-half of the inlet face area of the filter is defined by open channels which are closed at the exit face of the filter. Because of this closure, the exhaust fumes or gases passing into the inlet of the filter must exit by diffusing through the porous walls between individual passageways. While exhibiting utility for filtering fluid streams, such as filtering carbon particulates from the exhaust gas of diesel engines, filters of the Pitcher type become clogged with use, with attendant increase in back pressure, causing loss of engine efficiency. Regeneration of a clogged filter (removal of the particles lodged therein) usually involve removing the filter from its mounting in an exhaust conduit.

Various methods have been proposed for the regeneration of filters for continuous use, for example, the use of a heater, located ahead of, and separate from the filter as disclosed in U.S. Pat. Nos. 4,878,928, 4,535,589 and 4,211,075. The in situ regeneration of a filter, utilizing the heating effect of electrical currents to incinerate accumulated particulates, is known. However, no one of such filters has been constructed of a porous metal honeycomb or monolith. Also, it is not known to preheat a honeycomb structure for light-off purposes by attaching or connecting electrodes to the structure.

It is therefore the object of the present invention to provide a heated device or structure which can be used to regenerate particulate filters, and/or to provide early light-off of catalytic converters, by energizing electrodes which are connected directly and integral to the surface of the structure.

SUMMARY OF THE INVENTION

According to the practice of this invention, a honeycomb structure or body of electrically conductive material, which is preheated by electrodes, is used to remove pollutants from combustion fluids. Briefly, the structure has an inlet end face, an outlet end face, thin walls defining cells extending longitudinally therethrough, and an outer surface. The structure is provided with a plurality of electrodes which are radially spaced around the outer surface of the structure such that electrical current can be passed to the structure through the electrodes.

In one embodiment, a device is provided for periodically regenerating a filter by burning off collected particulates which accumulate therein, such as carbon particles from diesel exhaust gas or fumes. In this embodiment, the device is a regenerating filter construction and consists of a honeycomb structure formed of a porous metal or porous cermet or porous silicon carbide. The structure includes a matrix of thin porous walls which define a plurality of cells extending longitudinally and mutually parallel therethrough, between the inlet and outlet end faces of the structure, the walls having substantially uniform interconnected open porosity of a volume and size sufficient to enable the fumes to flow completely through the walls and to restrain most or all of the particulates from passing completely through the walls. In this regenerative filter construction, an inlet group of the cells open at the inlet end face are closed adjacent to the outlet end face, and an outlet group of the cells are closed adjacent to the inlet end face and open at the outlet end face, and each cell of the inlet group shares cell walls with cells of the outlet group, and each cell of the outlet group shares cell walls with cells of the inlet group. A plurality of electrodes radially or preferably, angularly spaced around the outer surface of the structure, adjacent to the inlet end face of the structure, are secured to the outer surface, whereby electrical currents can be passed through the structure from selected pairs of said electrodes to thereby heat the porous metal honeycomb structure and burn off combustible particulates.

In another embodiment of the regenerative filter construction, the structure is formed of a porous, electrically conductive, high temperature resistant material.

Any material which is electrically conductive and which exhibits high temperature resistance is suitable for the practice of this invention. A cellular or honeycomb structure formed from any of these materials is provided with a plurality of radially disposed electrodes positioned near its input end, on the outer surface of the structure or body. Preferably, the electrodes are angularly spaced, extending from the outer surface of the body. In operation, the body is mounted in an exhaust gas conduit.

When it is desired to regenerate a filter by burning the carbon particulates, electric current is passed through the radially or angularly displaced electrodes, preferably sequentially employing different electrode pairs to provide uniform heating of the filter surface. By varying the pairs of electrodes which receive current, current is made to pass through different portions of the filter, the passage of such current accompanied by the usual $I^2R$ heating effect. Preferably, direct current is employed as opposed to alternating current, although useful results can be obtained with the latter.

One way of reducing the light-off time of the structure or reactor when used as a catalytic converter, is to preheat the cellular or honeycomb reactor so that the reactor will act as an igniter or initiate an exothermic catalytic reaction. Since the catalytic reaction is exothermic, once the reaction is initiated, it is self-sustaining if sufficient combustible gases are present. However, during cold start, there is generally an insufficient amount of combustible gases present in the normal exhaust of most internal combustion engines to make the reaction self-sustaining. Thus, significant amounts of electrical energy is required in the first few minutes following light-off to achieve the desired level of exothermic reaction. When a sufficiently high level of exothermic temperature is attained, the reaction becomes substantially self-sustaining. As the initial exhaust gases pass through the preheated inlet end of the structure, the gases are ignited and produce exothermic energy which then heat the rest of the structure. According to this invention, the time required to bring the structure to light-off and/or burn-off temperatures is reduced by preheating the structure. Preheating is accomplished by passing electric current to the structure through electrodes connected to an electrical power source.

Programmed energizing of selected pairs of the electrodes can provide substantially uniform heating of the entire entrance face of the body when used as a filter to produce more efficient burn-off of the carbon particulates in various regions of the filter. The location of the electrodes near the entrance or upstream end of the body reduces the energy required to initiate light-off and/or the burning action. Combustion which begins at the entrance face will be propagated downstream by the gas flow and by the exothermic reaction until the entire body has been subjected to combustion temperatures. The burning off of the carbon particulates involves heating them so that the carbon combines with oxygen to produce carbon dioxide which is then passed through the filter to the atmosphere. Catalytic conversion of the exhaust gas involves the conversion of hydrocarbons and nitrogen oxides to carbon dioxide, water and nitrogen.

A filter fashioned in accordance with this invention can be continuously operated, not requiring removal for cleaning or other regenerative processes to rid the filter of accumulated carbon particulates. The practice of this invention permits the filter to be cleaned either continuously or intermittently while it is carrying out its filtering action, thereby permitting continuous operation of the dieselengine whose exhaust fumes are to be purged of carbon. Alternatively, two or more filters can be installed on the vehicle with appropriate bypass valves such that, while one or more are actively filtering the exhaust fumes, others may be cleaned by combustion while off line, but still in the vehicle. Once cleaned, these filters can be valved into the active exhaust stream, and the previously active filters can be cleaned by combustion in their turn.

As used in this specification, cellular or honeycomb structure or body includes a matrix of walls defining a plurality of cells or passageways extending longitudinally and mutually parallel therethrough between inlet and outlet end faces of the body. The honeycomb can be either of a wall flow design or through flow design. While cellular structures of either design may be used for the catalytic converter of the invention, the through flow design is preferred. The wall flow design is particularly useful for the filter of the invention. In the wall flow design, the walls have substantially interconnected open porosity, and are of a volume and size sufficient to enable the exhaust fluids to flow completely through the walls and to restrain most or all of the particulates from passing through the walls. The inlet group of cells are open at the inlet end face of the structure and closed adjacent to the outlet end face. Similarly, the outlet group of cells closed adjacent to the inlet end face are open at the outlet end face, and each cell of the inlet group share cell walls with cell of the outlet group. In the through flow design, all cells are open at both end faces.

As used in this specification, the term "body" refers to a filter, a catalytic converter, or a structure which may be used for either application, depending on the context in which it is used. The term "honeycomb structure" as used herein is intended to embrace any monolithic structure having open-ended cells extending longitudinally along the extrusion axis of the structure.

DETAILED DESCRIPTION OF THE INVENTION

Figure 1:
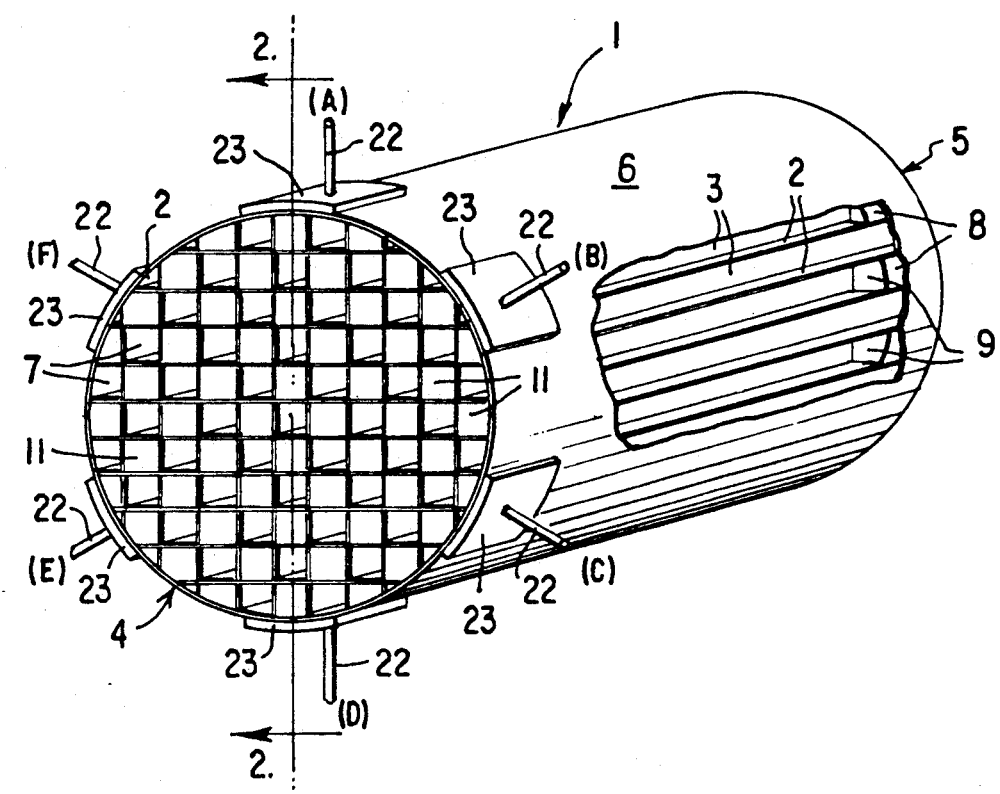
FIG. 1 is a partially broken away, perspective view of a cellular or honeycomb structure formed in accordance with this invention.

In the wall flow design shown in FIG. 1, the body 1 comprises a porous metal honeycomb or monolith structure defining a matrix of intersecting, uniformly thin walls 2 defining a plurality of cells 3. The cells 3 extend longitudinally and mutually parallel through the body 1 between the inlet end face 4 and the outlet end face 5. Ordinarily the body 1 also has a peripheral wall or skin 6. An inlet group of alternate cells 7 are open at the inlet end face 4 and are closed, sealed or plugged with closure means 8 adjacent outlet end face 5. Means 8 can be a sealant or cement mass adhering to walls 2 and extending from face 5 a short distance inwardly to end face 9 of means 8. The other alternate cells 10 form an outlet group and are open at outlet end face 5, but they are similarly closed adjacent inlet end face 4 by closure means 11, which likewise extend inwardly a short distance from face 4 to end face 12 of means 11. Thus, as viewed at end faces 4 and 5, the alternating open and closed cells are in a checkered or checkerboard pattern.

The honeycomb of the invention can be fashioned from stainless steel or other high temperature resistant metals or alloys, to yield a metal honeycomb or monolith. Such an alloy may be of the type shown in U.S. Pat. Nos. 4,758,272 and 4,992,233, both of which are herein incorporated by reference. Silicon carbide or a cermet may also be the material of construction of the filter.

In the wall flow design, body 1 is formed of a porous aluminum iron alloy of the type disclosed in U.S. Pat. Nos. 4,758,272 and 4,992,233. The walls 2 have the requisite interconnected open porosity therein. Means 8, 11 are generally impermeable to fluids. Materials for means 8, 11 may include ceramics (generally crystalline), glass-ceramics, glasses, metals, cermets, resins or organic polymers, papers or textile fabrics (with or without fillers), etc. and combinations thereof. For walls 2 and skin 6, it is preferred to fabricate them from plastically formable and sinterable finely divided particles and/or short length fibers of substances that yield a porous sintered electrically conductive material after being fired to effect sintering thereof, especially ceramics, glass-ceramics, glasses, metals and/or cermets. As desired (besides volatilizable plasticizers/binders for the formable particle batch or mixture), any suitable or conventional fugitive or combustible (burn-out) additive can be dispersed within the formable and sinterable mixture so as to provide appropriate and adequate open porosity in the sintered material of walls 2.

The body 1 can be fabricated by any suitable technique. It (without plugs 8 and 11) is made preferably by extrusion of a sinterable mixture in the manner as disclosed in U.S. Pat. Nos. 3,790,654, 3,919,384 and 4,008,033. Such extruded green honeycomb body is then fired for effecting the sintered condition thereof in the manner as disclosed in U.S. Pat. No. 3,899,326.

Plug means 8, 11 can then be formed in the sintered honeycomb or monolith 1 by injecting a sinterable or other suitable sealant mixture into the appropriate ends of the cells 3. For example such mixture can be injected by means of a pressurized air actuated sealant gun whose nozzle can be positioned at the proper cell openings on the end faces 4, 5 so as to extrude the mixture into and to plug the end portions of the cells. An appropriate assembly and positioning of an array of sealant nozzles of such gun(s) can be used to inject the plug mixture simultaneously in a plurality or all of the alternate cells at each face 4, 5 for efficient production. Upon subsequent firing of the body 1 after having been plugged with a sinterable or other heat-setting mixture, there results rigidified closure masses 8, 11 which are adherently bonded to adjacent portions of walls 2. These plugs 8, 11 are substantially nonpermeable to the fluid to be passed through body 1.

If so desired, the body 1 need not necessarily be fired or sintered before injecting sealant mixture, especially ceramic, metal or cermet cement, into the ends of the cells 3. For example, monolith 1 can be made of ceramic material having a firing temperature that is substantially the same as or closely similar to the firing or foaming temperature of an appropriately selected ceramic cement. In that case, the cement can be injected into the cell ends while the monolith is in the unfired or greenware state. Thereafter the green monolith with green cement plugs is fired to suitable temperature or temperatures within the appropriate range to effect sintering of the monolith and of the cement (including foaming thereof if that is a characteristic of it).

Figure 2:
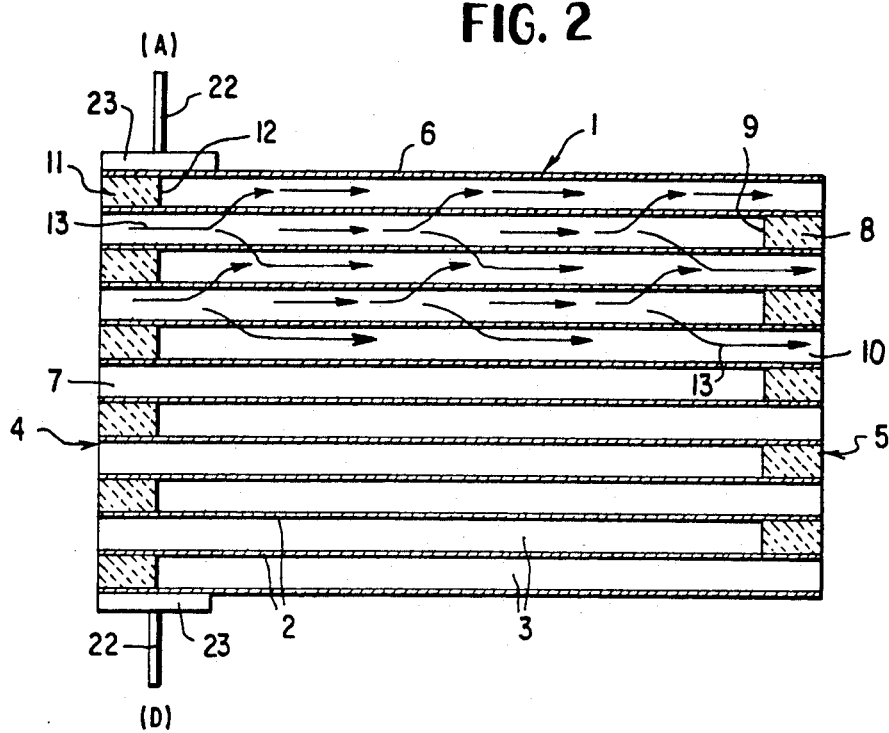
FIG. 2 is a longitudinal cross section taken along Section 2—2 of FIG. 1.

FIG. 2 shows the pattern of fluid flow through body 1. Fluid flow is indicated by the lines 13 with arrows. Thus, fluid 13 passes into inlet cells 7 from inlet end face 4, but because of the blocking effect of end faces 9 of plugs 8, the fluid under some pressure then passes through the pores or open porosity in cell walls 2 at top, bottom and both sides of the cells 7 so as to respectively enter outlet cells 10 above, below and on both sides of each cell 7. While fluid 13 passes through the entirety of all cell walls 2, their porosity is such as to catalyze the exhaust gas and/or restrain any particulates therein and thereon as a porous accumulation. Accumulated particulate load gradually plugs the porous openings in the walls, increasing the pressure drop required to maintain the same fluid flow. It can be seen that the entirety of all cell walls 2 act as a catalyst or filters for unique superior catalytic conversion and/or filter capabilities. The fluid 13 passing into cells 10 then flows out of these cells at the outlet end face 5, since the end faces 12 of plugs 11 adjacent the inlet end face 4 prevents the fluid from reversing direction. Also, plugs 11 prevent fluid 13 from directly entering cells 10 without first going into cells 7 and through walls 2.

While it is preferred to make the transverse cross-sectional geometry of the cells 3 to be squares as shown in FIG. 1, any other suitable geometries may be employed. Examples of such other geometries are equilateral triangles, right triangles, rhomboids, rhombuses, rectangles and a repeating pattern of other quadrilaterals. In each of these polygonal shapes, intersecting walls 2 preferably form included angles that are not less than 60° to avoid the nonuniform accumulation of particulates in smaller angle corners and to enable proper complete plugging of the alternate cells adjacent end faces 4, 5. Also, it may be desirable for enhanced mechanical strength of the honeycomb bodies that the cell corners be filleted or slightly filled in with the same or similar material as forms cell walls 2. That latter concept can be extended to a presently lesser desirable form of circular transverse geometry. The walls 2 have a substantially uniform thickness throughout in that they substantially uniformly vary from their thinnest portions to their thicker (or maximum filleted) portions. Another alternative to the latter one would be elliptical transverse cell geometry. If it is desired for certain purposes, the body can be made with a plurality of transverse sectors (e.g. annular or pie/wedge shaped) whereby the transverse cell cross-sectional areas are larger in a sector or sectors than such areas are in another sector or other sectors. It is even conceivable that repeating patterns of different transverse geometric cell shapes can be employed in different transverse sectors.

In all variations of the body for filter application, with respect to transverse cell geometry, alternate cells are plugged adjacent each end face in a checkered style pattern such that those cells plugged at the inlet end face are open at the outlet end face and vice versa. Alternate cell plugging is not required for the catalytic converter application. Also, the transverse cross-sectional areas of the cells are desirably sized to provide transverse cell densities in the range of about 1–93 cells/cm$^2$. Correspondingly, it is desirable to make the thin walls with thickness in the range of about 0.05–1.5 mm. Preferably the wall thickness is in the range of 0.1–1.27 mm.

Figure 3:
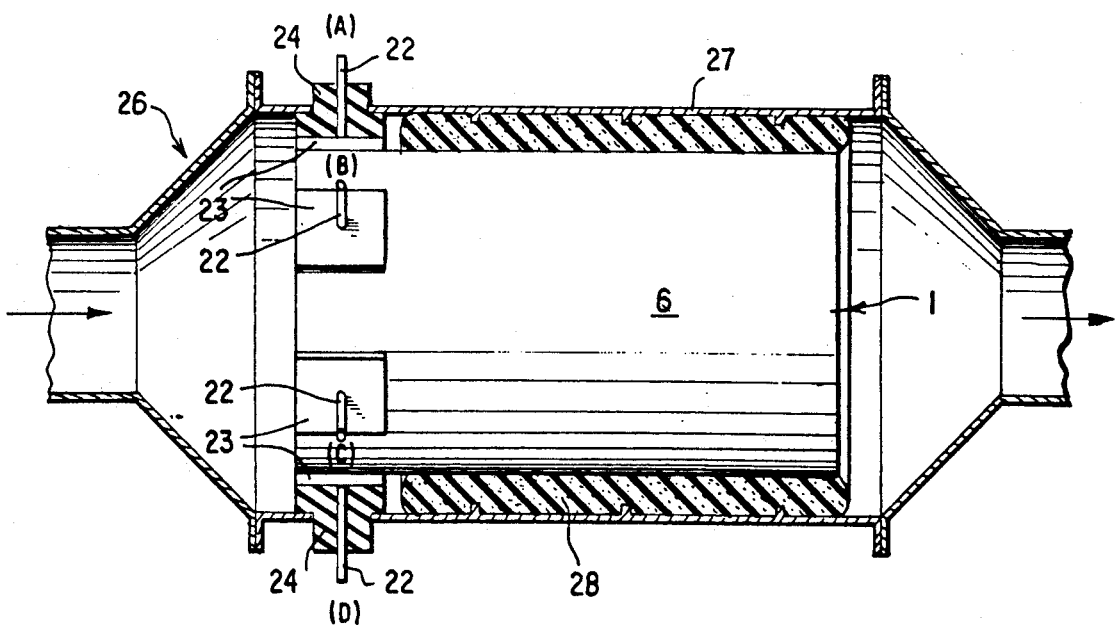
FIG. 3 is a longitudinal cross section of the body of FIG. 1 shown as mounted in a portion of a typical diesel engine exhaust conduit.

Referring again to FIG. 1 of the drawings, and now to FIG. 3, a plurality of angularly disposed and radially extending electrodes 22, including base portions 23, are mechanically and electrically connected, as by welding or brazing, to the outside skin 6 of the body, with six such electrodes being illustrated at FIG. 1. Each electrode is further designated as either A, B, C, D, E, F. Body 1 is typically mounted in an exhaust gas conduit 26, shown at FIG. 3. An insulating sleeve 24 is provided around each electrode 22, with each sleeve 24 passing through a corresponding opening in the exhaust conduit. The central portion 27 of conduit 26 is cylindrical to conform to the cylindrical shape of the body, as is electrical insulating sleeve 28 between the body and the metal conduit. The shape of body 1 need not be a circular cylinder, and can be a rectangular solid, a hexagonal or oval cylinder, or indeed any other shape which may be dictated by the space requirements of the vehicle in which it is to be mounted.

For particulate filter regeneration, diesel exhaust fumes containing carbon particulates pass through body 1 from its inlet to its outlet face, with the filtering action taking place as indicated at FIG. 2 and previously described. After a predetermined length of time, the pressure drop of the fumes flowing through the body significantly increase because of the accumulation of carbon particulates in the porous walls 2 of cells 3.

For early light-off application, exhaust gases containing hydrocarbons and nitrogen oxide contaminants pass through the honeycomb body for catalytic conversion of the contaminants into nitrogen and carbon dioxide. The catalytic reactions necessary for such conversion occur when the gas temperature reaches its ignition temperature. In a non-preheated body, the light-off time may be as high as several minutes, during which time pollutants escape into the atmosphere. By heating the catalytic converter, particularly near the inlet face of the converter, early light-off is attained and the light-off time is reduced considerably.

Particulates can be burned off and early light-off can be achieved in the following manner. By means of conventional electrical switching circuitry, selected pairs of electrodes 22 are coupled to a source of (preferably) direct current, with selected pairs being operated in sequence. In a preferred embodiment, an even number of electrodes are used so that by applying electrical current to opposed electrodes current can be passed across the center of the structure. A typical sequence is as follows: electrodes 22-A and 22-D are energized for a predetermined period of time. Then, electrodes 22-B and 22-E are energized, then electrodes 22-C and 22-F are energized, then, electrodes 22-B and 22-D are energized, then, electrodes 22-C and 22-E are energized then, electrodes 22-D and 22-F are energized, next, electrodes 22-A and 22-E are energized, and lastly, electrodes 22-B and 22-F are energized. In addition to energizing substantially diametrically opposed electrodes, current can be directed along the perimeter of the structure so as to energize pairs of adjacent electrodes. Current can also be directed so as to energize alternate electrodes. The current source can be the engine such that current is passed to energize the electrodes as soon as the engine is activated in the case of a light-off application, or as needed in filter applications.

For early light-off application, once the electrodes are energized, the inlet end face of the body is heated to the ignition temperature of the exhaust gas, the gas is ignited. By repeating the energizing sequence described above as needed, the light-off temperature is quickly achieved. By exothermic reaction, the rest of the body is heated to the light-off temperature as the gas passes through the walls and cells of the body. In certain cases, electrical energy may be required in addition to the exotherm to sufficiently heat the outlet end portion of the body to attain light-off. The electrode energizing sequence or cycle described above may be repeated as necessary to obtain the desired result. For filter regeneration purposes, depending upon the operating conditions and parameters of the particular diesel engine and particular filter employed, one or more such cycles may be necessary for regeneration.

In the preferred embodiment, one complete sequence or cycle will take between one tenth second and ten seconds, preferably between one and two seconds per sequence. The cycles may be repeated for a total time of from 0.1 second to 20 minutes in order to accomplish the necessary heating and desired result. These times are preferred but in certain circumstances, either longer or shorter times may be appropriate. For example, for light-off applications, about 10 to 300 cycles of 0.1 second per cycle may be sufficient to ignite the exhaust gas so that the total cycle time may be in the range of 1 to 30 seconds depending on the electrical conductivity of the body 1 material, and the exhaust gas composition. The proportion of cycle time devoted to each circuit arrangement can be varied to produce an averaged, uniform heating of the entire entry face.

It has been found that if the inlet plugs 11 are of the same or similar electrically conductive material as the body 1, the thickness of plugs 11 from face 4 to face 12 of the filter can be made different from place to place on the inlet face 4 to modify the heating pattern. For example, areas such as those close to the electrode 22, which tend to run hotter regardless of the circuit used, can be made with thicker plugs. This lowers the electrical resistance of such areas, thereby reducing what would otherwise be excessive heating at these areas.

A similar heating pattern (such as lower electrical resistance near the electrodes) can be achieved by using plugs 11 of uniform thickness, but with higher or lower electrical resistivity than that of the body 1. It is also possible to combine the effects of varying plug thickness and varying plug resistivity to achieve a desired resistance distribution.

Ideally, for particulate filter regeneration, combustion of the carbon particulates carried by the diesel exhaust fumes will commence at the inlet face of the body, the combustion continuing as the fumes pass along the cells and is complete upon finally exiting from the outlet face of the body. Because the flow of exhaust fumes or gas is uniform over the inlet face of the body, it is desirable that the temperature to initiate combustion at the inlet face be uniform at all regions or areas thereof. In order that this uniformity of temperature is realized, it is necessary to employ plugs 11 of the described differences in resistance or resistivity over various areas of the input face of the body. This need is readily understood when recalling that the electrical current density immediately adjacent or contiguous to electrodes 22 would be greater than the current density at other regions of the input face. By thus decreasing the resistance near the electrodes, by means of different resistance/resistivity plugs at these regions, the desired uniform heating over the inlet face can more nearly be realized. The different plug resistances together with the previously described use of alternate electrode pairs in sequence, both contribute to the creation of uniform combustion temperatures over the inlet face of the body.

Typically, the electrical source will be either a 12 or 24 volt battery. The resistivity of a typical body material is from about 0.01 to 0.5 ohm cm. A typical porosity of the body walls 2 for filter application is 40–45% with an average pore size of about 1 to 10 microns. For light-off application cell wall porosity is not required.

We claim:

1. A device for removal of pollutants from exhaust gases comprising:
   a honeycomb structure formed of electrically conductive material;
   said structure having an inlet end face, an outlet end face, thin walls defining cells extending longitudinally therethrough, and an outer surface;
   at least three electrodes spaced around the inlet end of said outer surface;
   plugs disposed in cells on the inlet end face, in the regions close to the electrodes to reduce electric current density in said regions; and
   means for sequentially energizing said electrodes by directing electric current to selected electrodes to uniformly heat the inlet end face.

2. The device of claim 1, comprising six electrodes, each electrode being designated as either A, B, C, D, E or F, wherein all substantially diametrically opposed electrodes are energized by passing electric current to selected electrodes in a sequence comprising the following pairs of electrodes A-C, A-D, A-E, B-D, B-E, B-F, C-E, C-F, and D-F.

3. An electrically heated device for catalytic conversion of exhaust gases comprising a catalytically active honeycomb structure having inlet and outlet end faces, a matrix of thin walls defining a plurality of cells extending longitudinally and mutually parallel therethrough between said inlet and outlet end faces, and at least three electrodes spaced around the outer surface and near the inlet end face of said structure.

4. The device of claim 3, wherein said walls are not greater than about 1.5 mm thick.

5. A regenerating filter construction for periodically regenerating a filter by burning off collected particulates which accumulate therein, the filter being an electrically conductive honeycomb structure having a matrix of thin porous walls defining a plurality of cells extending longitudinally and mutually parallel therethrough between inlet and outlet end faces of the filter, the walls having substantially uniform interconnected open porosity of a volume and size sufficient to enable the fumes to flow completely through the walls and to restrain substantially all of the particulates from passing completely through the walls, an inlet group of the cells open at the inlet end face and closed adjacent to the outlet end face, an outlet group of the cells closed adjacent to the inlet end face and open at the outlet end face, each cell of the inlet group sharing cell walls with cells of the outlet group, each cell of the outlet group sharing cell walls with cells of the inlet group, at least three electrodes angularly spaced around the outer surface of the filter, adjacent to the filter inlet face, and secured to said outer surface, whereby electrical currents can be passed through the filter from selected pairs of said electrodes to thereby heat the filter and burn off the collected particulates.

6. The filter construction of claim 5, wherein said walls are not greater than about 1.5 mm thick.

7. The filter construction of claim 5, comprising a diesel engine exhaust gas conduit, wherein the filter is disposed within the gas conduit across the exhaust gas path, such that the inlet face of the filter faces upstream of the exhaust gas path.

8. The filter construction of claim 9, wherein the cells o the filter are of a density in the range of 1-93 cells/cm$^2$.

9. The filter construction of claim 5, wherein the cells of said outlet group are closed at their inlet ends by plugs.

10. The filter construction of claim 9, wherein the plugs in the region close to the electrodes are made of material having lower electrical resistance than the remainder of the plugs.

11. The filter construction of claim 9, wherein the plugs in the region close to the electrodes are of greater thickness in the longitudinal direction of the cells than the remainder of the plugs.

12. The device of claim 1, wherein all cells on the inlet end face are plugged, and wherein the plugs in the regions close to the electrodes are of greater thickness than the plugs in other regions of the inlet end face of the structure.

13. The device of claim 1, wherein the plugs in the regions are made of material having higher electrical resistance than plugs in other regions of the inlet end face.

14. The device of claim 13, wherein in addition to having higher electrical resistance, the plugs close to the electrodes are also thicker than the plugs in other regions of the inlet end face.

15. The device of claim 6 further comprising the following sequence: A-B, B-C, C-D, D-E, E-F, and F-A.

16. The device of claim 9, wherein said honeycomb structure is a catalytic converter having formed thereon catalyst to convert hydrocarbons and nitrogen oxides to hydrogen and carbon dioxide.

17. The device of claim 16, wherein the sequence is repeated until light-off of the catalyst is achieved.

18. The device of claim 17, wherein said light-off is achieved in a period of time in the range of 1 to 30 second.

* * * * *

UNITED STATES PATENT AND TRADEMARK OFFICE
CERTIFICATE OF CORRECTION

PATENT : 5,259,190
DATED : November 9, 1993
INVENTOR(S) : Rodney D. Bagley and G. Daniel Lipp It is certified that error appears in the above-identified patent and that said Letters Patent is hereby corrected as shown below:

On the title page, item [63], November 8, 1991 should be --August 1, 1991--

Col. 10, line 13, "9" should be "5"

Col. 10, line 14, "o" should be "of"

Col. 10, line 51, "second" should be "seconds"

Signed and Sealed this

Twenty-fifth Day of October, 1994

Attest:

BRUCE LEHMAN

Attesting Officer     Commissioner of Patents and Trademarks